United States Patent Office 2,877,264
Patented Mar. 10, 1959

2,877,264
PROCESS FOR PREPARING HYDROXYALKYL ACRYLATES AND METHACRYLATES

Joseph L. O'Brien, Elkins Park, and Henry J. Schneider, Hatboro, Pa., assignors to Rohm & Haas Company, Philadelphia, Pa., a corporation of Delaware No Drawing. Application February 14, 1957
Serial No. 640,082

4 Claims. (Cl. 260—486)

This invention relates to a process for preparing hydroxyalkyl acrylates and methacrylates in a convenient and commercially feasible way.

The present application is a continuation-in-part of our application Serial No. 623,302, filed November 20, 1956, now abandoned.

It has now been found that hydroxyalkyl acrylates and methacrylates can be prepared in good yield by the selective hydrolysis of corresponding vinyloxyalkyl acrylates and methacrylates. Vinyloxyalkyl acrylates and methacrylates are prepared in accordance with the teaching of United States Patent No. 2,692,256.

A typical reaction within the scope of this invention may be represented structurally, showing the preparation of 4-hydroxybutyl methacrylate, as follows:

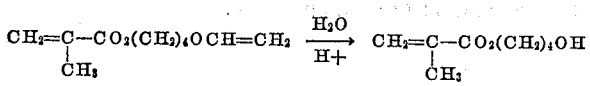

Selective hydrolysis of vinyloxyalkyl acrylates and methacrylates to produce hydroxyalkyl acrylates and methacrylates may be accomplished by hydrolyzing the former with a solution of strong mineral acid. Sulfuric, hydrochloric, nitric and phosphoric acids are typical of the strong mineral acids which may be employed. Preferably the hydrolysis is carried out in the presence of a conventional free-radical polymerization inhibitor, for example, hydroquinone, N,N'-di-2-(1,4-naphthoquinonyl)-p-phenylenediamine and the like although it can be carried out in the absence of such an inhibitor. When the starting material is relatively insoluble in water, a cosolvent such as dioxane may be used to bring about solution thereof during hydrolysis.

The following examples show embodiments of this invention.

EXAMPLE 1

Preparation of 4-hydroxybutyl methacrylate

Twenty grams of 4-vinyloxybutyl methacrylate (B. P. 65–72°/1 mm. $n_D^{26}$ 1.4468) and 100 ml. of 0.5% aqueous sulfuric acid were stirred together for 16 hrs. at ambient temperature. The organic layer was separated. After saturating the aqueous layer with sodium chloride, the solution was extracted with benzene. The benzene extract was combined with the organic layer and the benzene solution was washed with water, dried with anhydrous magnesium sulfate and filtered. After addition of 0.2 g. of the polymerization inhibitor N,N'-di-2-(1,4-naphthoquinonyl)-p-phenylenediamine, the benzene was stripped off and the residue distilled at reduced pressure. The product which collected at 65–70°/0.05 mm. amounted to 6.0 g. (35% yield) and was identified as 4-hydroxybutyl methacrylate, $n_D^{25}$ 1.4518.

Analysis.—Saponification No., 360; hydroxyl no., 343. Calc'd for $C_8H_{14}O_3$:355.

EXAMPLE 2

Preparation of 2-hydroxyethyl methacrylate

Twenty grams of 2-vinyloxyethyl methacrylate, 200 ml. of 1% sulfuric acid and a few crystals of hydroquinone were stirred at ambient temperature (about 30° C.). After one hour the mixture was homogeneous. The clear solution was allowed to stand overnight. It was then saturated with sodium chloride and extracted with five 80 ml. portions of ether. The ether solution was treated with anhydrous potassium carbonate to remove water and traces of acid, and then filtered. After the addition of 0.2 g. of N,N'-di-2-(1,4-naphthoquinonyl)-p-phenylenediamine to the pot, the ether was stripped off. The residue was distilled at reduced pressure, yielding a main fraction, B. P. 55–65° C./0.3–0.4 mm., $n_D^{28}$ 1.4489, identified as 2-hydroxyethyl methacrylate. Wt. 12.8 g. (77% yield).

Analysis.—Calc'd for $C_6H_{10}O_3$: Saponification no., 431; hydroxyl no., 431. Found: Saponification no., 432; hydroxyl no., 418.

EXAMPLE 3

Preparation of 4-hydroxybutyl methacrylate

Fifty-seven grams of 4-vinyloxybutyl methacrylate, 570 g. of 1% aqueous sulfuric acid, 100 ml. of dioxane and 0.1 g. of inhibitor, N,N'-di-2-(1,4-naphthoquinonyl)-p-phenylenediamine, were stirred and heated to 55–60° C. for four hours. The resulting clear solution was cooled to room temperature and saturated with sodium chloride. The small organic layer was separated and the aqueous layer extracted twice with ether. The ether extract was combined with the organic layer. The ether solution was dried with anhydrous magnesium sulfate and filtered. After addition of a small quantity of N,N'-di-2-(1,4-naphthoquinonyl)-p-phenylenediamine, the ether was stripped off at atmospheric pressure and the residue distilled at reduced pressure. The product which collected at 80–95° C./0.1–0.2 mm. amounted to 25 g. (51% yield) and was identified as 4-hydroxybutyl methacrylate.

Analysis.—Calc'd for $C_8H_{14}O_3$: Saponification no., 355; hydroxyl no., 355. Found: Saponification no., 354; hydroxyl no., 382.

EXAMPLE 4

Preparation of 5-hydroxypentyl methacrylate

One-hundred and six grams of 5-vinyloxypentyl methacrylate, 570 g. of 1% aqueous sulfuric acid, 100 ml. of dioxane and 0.1 g. of N,N'-di-2-(1,4-naphthoquinonyl)-p-phenylenediamine were stirred and heated to 55–60° C. for four hours. The reaction mixture was cooled, saturated with sodium chloride and stirred for another fifteen minutes. The mixture was then extracted with several portions of ether. The combined ether extract was dried over anhydrous magnesium sulfate and filtered. The ether was stripped off at partial aspirator pressure and the residue distilled at reduced pressure, after the addition of 1.4 g. of N,N'-di-2-(1,4-naphthoquinonyl)-p-phenylenediamine. The product which collected at 85–90° C./0.03–0.04 mm. amounted to 33.3 g. (36% yield) and was identified as 5-hydroxypentyl methacrylate.

Analysis.—Calc'd for $C_9H_{16}O_3$: Saponification no., 326; hydroxyl no., 326. Found: Saponification no., 325; hydroxyl no., 362.

EXAMPLE 5

Preparation of 2-hydroxyethyl acrylate

Nine and three-tenths g. of 2-vinyloxyethyl acrylate, 100 ml. of 1% aqueous sulfuric acid and 0.1 g. of hydroquinone were stirred at room temperature (about 30° C.). After one hour the mixture was homogeneous. The clear solution was allowed to stand overnight. It was then saturated with solid sodium chloride and extracted with five 50 ml. portions of ether. The combined ether extract was washed once with 50 ml. of 10% potassium carbonate solution and then dried with anhydrous potassium carbonate and filtered. After the addition of 0.05 g. of hydroquinone to the pot, the ether was stripped off at atmospheric pressure to give 4.3 g. (57% yield) of a clear, yellow oil identified as 2-hydroxyethyl acrylate, $n_D^{25}$ 1.4480.

*Analysis.*—Calc'd for $C_5H_8O_3$: Saponification no., 484; hydroxyl no., 484. Found: Saponification no., 496; hydroxyl no., 481.

Following the procedure of Example 5 using 4-vinyloxybutyl acrylate and 5-vinyloxypentyl acrylate, respectively, there resulted in good yield, in the first instance, 4-hydroxybutyl acrylate and, in the second, 5-hydroxypentyl acrylate.

The hydroxyalkyl acrylates and methacrylates prepared as herein set forth are useful components in coating compositions and in forming copolymers with compatible polymerizable compounds.

We claim:

1. The process for preparing lower hydroxyalkyl acrylates and methacrylates from the corresponding lower vinyloxyalkyl acrylates and methacrylates which comprises selectively hydrolyzing the latter with a dilute aqueous solution of a strong mineral acid at a temperature at which selective hydrolysis of the vinyloxy group will occur, and thereafter separating the former from the reaction mixture.

2. The process for preparing lower hydroxyalkyl acrylates and methacrylates from the corresponding lower vinyloxyalkyl acrylates and methacrylates which comprises selectively hydrolyzing the latter with a dilute aqueous solution of a strong mineral acid at a temperature at which selective hydrolysis of the vinyloxy group will occur and in the presence of a free-radical polymerization inhibitor, and thereafter separating the former from the reaction mixture.

3. The process for preparing lower hydroxyalkyl acrylates and methacrylates from the corresponding lower vinyloxyalkyl acrylates and methacrylates which comprises selectively hydrolyzing the latter with a dilute aqueous solution of a strong mineral acid in the presence of dioxane at a temperature at which selective hydrolysis of the vinyloxy group will occur, and thereafter separating the former from the reaction mixture.

4. The process for preparing lower hydroxyalkyl acrylates and methacrylates from the corresponding lower vinyloxyalkyl acrylates and methacrylates which comprises selectively hydrolyzing the latter with a dilute aqueous solution of a strong mineral acid in the presence of dioxane at a temperature at which selective hydrolysis of the vinyloxy group will occur and in the presence of a free-radical polymerization inhibitor, and thereafter separating the former from the reaction mixture.

References Cited in the file of this patent

UNITED STATES PATENTS

| | | |
|---|---|---|
| 2,129,722 | Woodhouse | Sept. 13, 1938 |
| 2,484,487 | Caldwell | Oct. 11, 1949 |
| 2,692,256 | Bauer et al. | Oct. 19, 1954 |

OTHER REFERENCES

Blout et al.: "Monomers," chapter on Vinyl Ethers, by Schildknecht (1951), pp. 29–30.